US008166534B2

(12) United States Patent
Yariv et al.

(10) Patent No.: US 8,166,534 B2
(45) Date of Patent: Apr. 24, 2012

(54) INCORPORATING NETWORK CONNECTION SECURITY LEVELS INTO FIREWALL RULES

(75) Inventors: Eran Yariv, Redmond, WA (US); Gerardo Diaz Cuellar, Redmond, WA (US); David Abzarian, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 11/804,423

(22) Filed: May 18, 2007

(65) Prior Publication Data

US 2008/0289027 A1 Nov. 20, 2008

(51) Int. Cl.
H04L 29/06 (2006.01)
(52) U.S. Cl. ............... 726/11; 726/3; 726/2; 726/14; 713/153; 713/150; 709/238; 709/227; 370/351; 370/401
(58) Field of Classification Search .................. None
See application file for complete search history.

(56) References Cited

U.S. PATENT DOCUMENTS

| | | | |
|---|---|---|---|
| 5,968,176 A | 10/1999 | Nessett et al. | |
| 6,327,660 B1 * | 12/2001 | Patel | 713/193 |
| 6,493,756 B1 * | 12/2002 | O'Brien et al. | 709/224 |
| 6,721,890 B1 * | 4/2004 | Shrikhande | 726/14 |
| 6,915,437 B2 | 7/2005 | Swander et al. | |
| 6,917,980 B1 * | 7/2005 | Gusler et al. | 709/229 |
| 6,996,842 B2 | 2/2006 | Strahm et al. | |
| 7,028,336 B2 | 4/2006 | Wesinger, Jr. et al. | |
| 7,188,365 B2 | 3/2007 | Balissat et al. | |
| 7,284,267 B1 * | 10/2007 | McArdle et al. | 726/11 |
| 7,308,706 B2 * | 12/2007 | Markham et al. | 726/4 |
| 7,496,962 B2 * | 2/2009 | Roelker et al. | 726/23 |
| 7,509,673 B2 * | 3/2009 | Swander et al. | 726/11 |
| 7,559,082 B2 * | 7/2009 | Morgan et al. | 726/14 |
| 7,603,333 B2 * | 10/2009 | Finkelstein et al. | 706/48 |
| 7,639,714 B2 * | 12/2009 | Stolfo et al. | 370/474 |
| 7,701,945 B2 * | 4/2010 | Roesch et al. | 370/394 |
| 7,739,728 B1 * | 6/2010 | Koehler, Jr. et al. | 726/11 |
| 7,760,733 B1 * | 7/2010 | Eiriksson et al. | 370/392 |
| 7,877,795 B2 * | 1/2011 | Aaron | 726/11 |
| 7,904,940 B1 * | 3/2011 | Hernacki et al. | 726/1 |
| 7,966,654 B2 * | 6/2011 | Crawford | 726/11 |
| 7,987,503 B2 * | 7/2011 | Liu | 726/11 |
| 2003/0097590 A1 | 5/2003 | Syvanne | |
| 2003/0142673 A1 * | 7/2003 | Patil et al. | 370/392 |
| 2004/0003290 A1 * | 1/2004 | Malcolm | 713/201 |
| 2004/0054610 A1 * | 3/2004 | Amstutz et al. | 705/36 |
| 2004/0090921 A1 * | 5/2004 | Russell Bennett | 370/241 |
| 2004/0100951 A1 * | 5/2004 | O'neill | 370/389 |
| 2004/0111643 A1 * | 6/2004 | Farmer | 713/201 |
| 2004/0268123 A1 * | 12/2004 | Le et al. | 713/160 |
| 2005/0210291 A1 | 9/2005 | Miyawaki et al. | |
| 2005/0229246 A1 * | 10/2005 | Rajagopal et al. | 726/14 |

(Continued)

OTHER PUBLICATIONS

NSIS Signaling Layer Protocol (NSLP) for Network . . . Internet-Draft NAT/FW NSIS NSLP, Stiemerling et al, May 2004.*

(Continued)

*Primary Examiner* — Syed A. Zia
(74) *Attorney, Agent, or Firm* — Wolf, Greenfield & Sacks, P.C.

(57) ABSTRACT

Embodiments of the present invention are directed to establishing and/or implementing firewall rules that may employ parameters based on connection security levels for a connection between devices. A firewall may thus provide greater granularity of security and integrate more closely with other security methods to provide better overall security with fewer conflicts.

20 Claims, 9 Drawing Sheets

U.S. PATENT DOCUMENTS

| | | | |
|---|---|---|---|
| 2005/0240990 A1* | 10/2005 | Trutner et al. | 726/11 |
| 2005/0262554 A1* | 11/2005 | Brooks et al. | 726/11 |
| 2005/0268331 A1* | 12/2005 | Le et al. | 726/11 |
| 2006/0015935 A1 | 1/2006 | Dixon et al. | |
| 2006/0195899 A1 | 8/2006 | Ben-Shachar et al. | |
| 2007/0016945 A1 | 1/2007 | Bassett et al. | |
| 2007/0204338 A1* | 8/2007 | Aiello et al. | 726/11 |
| 2008/0148380 A1* | 6/2008 | Abzarian et al. | 726/11 |
| 2009/0083727 A1* | 3/2009 | Fu et al. | 717/172 |
| 2009/0150977 A1* | 6/2009 | Carley | 726/3 |
| 2009/0265755 A1* | 10/2009 | Hamilton et al. | 726/1 |
| 2010/0107172 A1* | 4/2010 | Calinescu et al. | 718/104 |
| 2010/0180331 A1* | 7/2010 | Murakami et al. | 726/11 |
| 2011/0072506 A1* | 3/2011 | Law et al. | 726/11 |
| 2011/0219444 A1* | 9/2011 | Turley et al. | 726/13 |

OTHER PUBLICATIONS

Hamed et al., "Taxonomy of Conflicts in Network Security Policies," School of Computer Science, Telecommunications and Information Systems, De Paul University, Chicago, USA, pp. 1-8. 2006.

Fu et al., "IPSec/VPN Security Policy: Correctness, Conflict Detection and Resolution," Computer Science Department, North Caroline State University, US, pp. 1-18. 2001.

TCP/IP Fundamentals for Microsoft Windows, downloaded from www.http://ms.helifan.net/technet/network/evaluate/technol/tcpipfund/tcpipfund_ch13.mspx 2006.

* cited by examiner

```
Action=Allow
Active=TRUE
Dir=In
Protocol=6
LPort=80
RA4=LocalSubnet
RA6=LocalSubnet
Svc=XYZService
App=%SystemRoot%\system32\svchost.exe
Security=Authenticate
Name=@wfapi.dll,-29001
EmbedCtxt=@wfapi.dll,-29000
AutoGenIPsec=FALSE
```

INCORPORATING NETWORK CONNECTION SECURITY LEVELS INTO FIREWALL RULES

BACKGROUND OF INVENTION

Since the development of computer networks, security has been a concern of administrators of computers and computer networks. As a result, many different methods of securing computers have been proposed.

One such security method is a firewall. Firewalls provide for security of computers by regulating what data is allowed into and out of a computer or a computer network to which the computer is connected.

Another method for computer network security is Internet Protocol Security (IPsec), also called connection security. IPsec is a protocol that secures connections between two computers, or a computer and a computer network having a device supporting IPsec.

SUMMARY OF INVENTION

Embodiments of the present invention are directed to establishing and/or implementing firewall rules that may employ parameters based on connection security levels for a connection between devices. A firewall may thus provide greater granularity of security and integrate more closely with other security methods to provide better overall security with fewer conflicts.

In one embodiment, there is provided a method for configuring a firewall for use in a computer system that comprises at least one first device disposed inside the firewall and at least one second device disposed outside the firewall. The method comprises an act of establishing at least one rule for the firewall that determines at least one filtering function. The filtering function is one that the firewall performs on communications between the at least one first device and the at least one second device. The at least one rule employs at least one filtering parameter that is based on at least one connection security level established for a connection between the at least one first device and the at least one second device.

In another embodiment, there is provided at least one computer readable medium encoded with a plurality of instructions that, when executed, perform a method for configuring a firewall for use in a computer system that comprises at least one first device disposed inside the firewall and at least one second device disposed outside the firewall. The method comprises an act of implementing at least one rule for the firewall that determines at least one filtering function. The filtering function is one that the firewall performs on communications between the at least one first device and the at least one second device. The at least one rule employs at least one filtering parameter that is based on at least one connection security level established for a connection between the at least one first device and the at least one second device.

In a further embodiment, there is provided a device for use in a computer system that comprises a firewall, at least one first device disposed inside the firewall, and at least one second device disposed outside the firewall. The device comprises at least one processor programmed to implement at least one rule for the firewall. The at least one rule determines at least one filtering function that the firewall performs on communications between the at least one first device and the at least one second device. The at least one rule employs at least one filtering parameter that is based on at least one connection security level established for a connection between the at least one first device and the at least one second device.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is an exemplary schema that may be used to store firewall rules created in accordance with one embodiment of the present invention;

DETAILED DESCRIPTION

Figure 1:
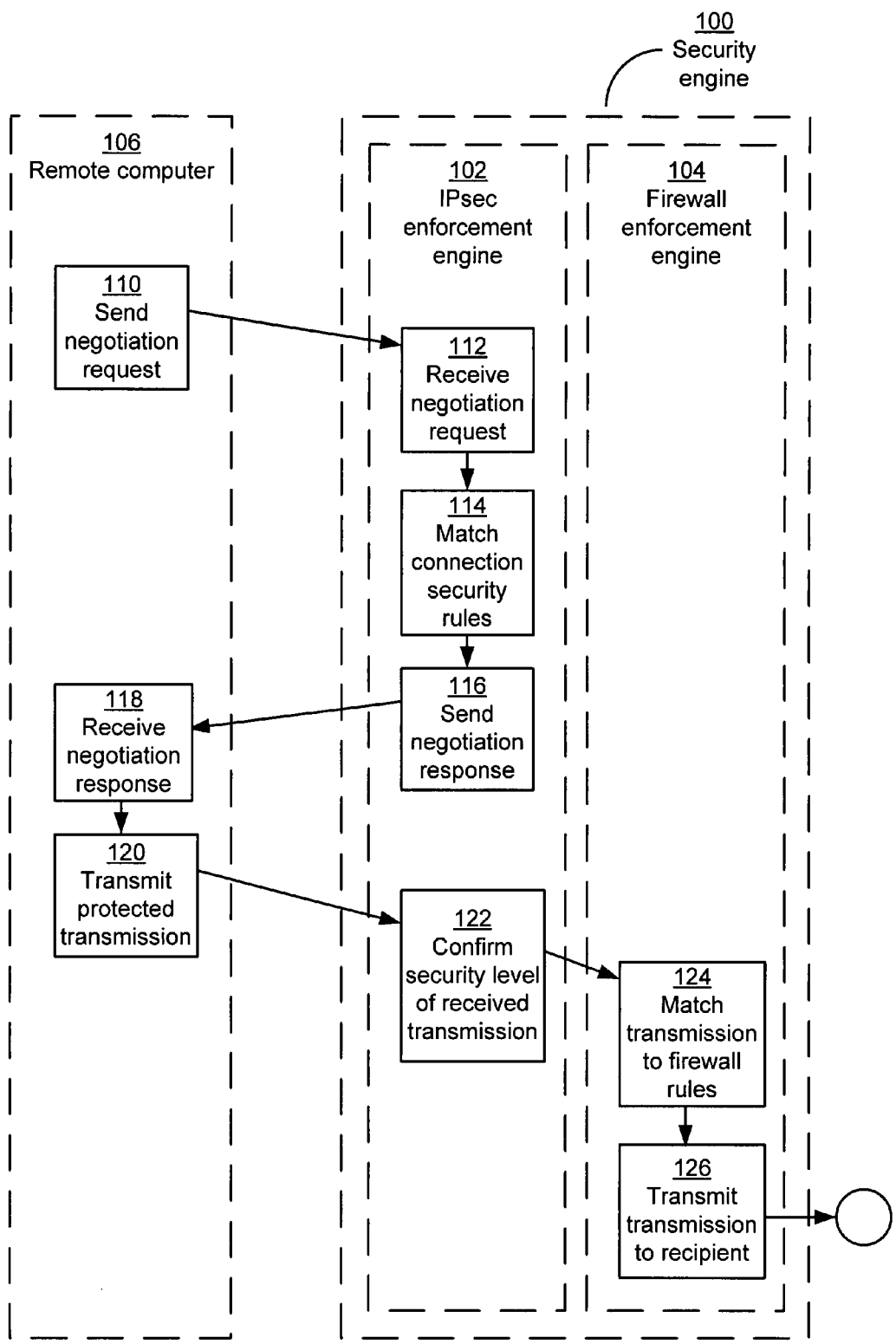
FIG. 1 is a flowchart of an illustrative process of an overall communication flow in accordance with one embodiment of the present invention.

Applicants have appreciated that firewall and connection security (e.g., IPsec) methods are typically implemented alone, and that more robust security may be provided by combining them. For example, a computer or computer network may be better protected if a firewall were able to enforce firewall rules that evaluate security parameters typically enforced by connection security.

Although multiple security methods have been employed in conventional systems, their use in independent manners often leads to conflicts between the security methods. For example, a firewall's policy for a computer or computer network may specifically allow traffic from a certain sender/computer while a connection security policy for the computer or the computer network may block the sender/computer because it does not have sufficiently secure algorithms for connection security or may not be configured to connect securely (i.e., the sender/computer does not support connection security). This conflict may lead to the sender/computer being blocked by one security method despite being specifically allowed by another, which may, in turn, lead to difficulty in troubleshooting the multiple security elements. This troubleshooting may be made more difficult if there is variation in the ordering and precedence of the security elements (e.g., a firewall's policy may supersede a connection security policy in some circumstances but the connection security policy may supersede the firewall policy in others).

Because of this potential for difficulty, a computer or computer network administrator for a conventional system may have to duplicate (at least) his or her efforts for security by making changes to multiple security elements (e.g., firewall and IPsec) when seeking to make a change to the computer or computer network's security. This task may be more difficult if the security elements are hosted by different machines in a computer network. Further, in computers or computer networks having complex security policies, the effort involved in completing the task may be prohibitive. Thus, administrators may be dissuaded from combining security methods.

Applicants have appreciated that advantages can be achieved by integrating multiple security methods rather than implementing multiple security methods separately.

In one embodiment of the present invention, described in detail below, a firewall is provided having firewall rules based wholly or partially on IPsec connection security levels. However, it should be appreciated that the invention is not limited in this respect and that firewall rules can be adopted that evaluate parameters of other security techniques, or that two other types of security methods may be combined.

A firewall may be installed in many different places on a computer network, such as on a dedicated computer apparatus placed at an entry/exit point for the network (i.e., where one computer network connects to another computer network), or on a computer to regulate communication for the computer. Based on certain parameters, data may be "allowed" to pass through the firewall to its destination or may be "blocked" by the firewall and dropped. These parameters may be based on a variety of factors regulated by firewall rules.

While a firewall may be implemented with any suitable rules, an exemplary firewall may be implemented with an initial rule, such as "block all incoming traffic" or "allow all outgoing traffic." Other rules may be then added to the initial rule to define "exceptions" to the initial rule. For example, a firewall installed in a computer network having a web server may block all incoming traffic except traffic on Transmission Control Protocol (TCP) port 80 (port 80 is typically associated with web traffic following the Hypertext Transfer Protocol (HTTP)). A firewall could also limit which host computers may send or receive data through the firewall by implementing a firewall rule specifying certain host addresses such as a host's Internet Protocol (IP) address. As a further example, a firewall may limit at least some traffic based not on its origin or destination, but rather on what kind of data is being transmitted or received. A firewall may, for example, specify that only a certain computer service or computer application is permitted to communicate through the firewall. Additionally, firewall rules may be implemented based on a combination of any number of parameters. In this manner, a firewall rule may allow incoming traffic on TCP port 80 but may further stipulate that that traffic be HTTP traffic, to prevent the opening in the firewall (port 80) from being misused by another computer service or computer application.

It should be appreciated that this list of firewall rule parameters is merely exemplary, and that the techniques described herein can be used with firewall rules based on any characteristics of the data being exchanged.

IPsec-enabled devices, similar to firewalls, may be installed in many different places on a computer network, such as on a dedicated computer apparatus placed at an entry/exit point for the network (i.e., where one computer network connects to another computer network), or on a computer to regulate communication for the computer. When a remote computer attempts to initiate a connection to the computer or the computer network, the two computers enter a negotiation phase to determine how to protect the connection between them. A connection may be protected by one or more types of connection security. These types of connection security may include, for example, encryption of the data exchanged, authentication of one or both sides of the connection, prevention of data insertion by, for example, numbering of data packets exchanged (i.e., "anti-replay"), and/or integrity checking of data when received (to ensure it has not been altered during transmission). In this manner, IPsec may protect communications from being intercepted by third parties during exchange and prevent unauthorized computers from connecting to a computer or computer network.

In one exemplary implementation of IPsec, a computer initiating the connection will send to the other computer or device on the computer network a list of algorithms with which it may secure a connection. These algorithms may be encryption algorithms, authentication algorithms, anti-replay algorithms, integrity-checking algorithms, or any other suitable security algorithm. The other computer or device in the computer network may then compare the algorithms to its own list of algorithms to determine a set of algorithms which both sides of the connection support. The algorithms on one or both sides of the connection may be ranked by a security level and the set of algorithms determined may comprise the most secure set of algorithms supported by both sides of the connection. One or both sides of the connection may also have minimum security requirements for connections, including different minimum security requirements for different types of connections (e.g., for different origin computers or destination computers, or for different types of data exchanged), and these minimums may be used in determining the set of algorithms. The minimum security requirements may be, for example, a minimum security level for algorithms used for a connection, or may be minimum requirements for the types of security used for the connection (e.g., requiring encryption but not authentication), or may be any other suitable set of minimum security requirements.

Once the set of algorithms is determined, the other computer or the device may transmit the set of algorithms back to the computer to inform it as to how to initiate the connection. At this point, the computers or the computer and the device are said to have "negotiated" a connection security level. A connection is then established using the algorithms determined. Both sides of the connection may then monitor the communications exchanged and may sever the connection if any communication is received over the connection that does not conform to the negotiated connection security level, or ignore such communications.

If a set of algorithms supported by both ends of the connection cannot be determined, then, in some cases, the connection may not be established. In other cases, an insecure connection may be established in accordance with other security parameters.

Embodiments of the invention may be described below that implement IPsec to implement connection security policies. It should be appreciated, however, that embodiments of the invention are not limited to implementing IPsec and may implement any suitable connection security method.

FIG. 1 shows a flowchart of a process by which a remote computer 106 may establish a secure connection and securely transmit data to a second computing device in accordance with one embodiment of the present invention. It should be appreciated that the process of FIG. 1 is merely exemplary, and embodiments of the invention may be used in systems that implement any suitable process for establishing a connection and transmitting data.

It should be further appreciated that while the illustrative example shown in FIG. 1, and others discussed below, relate primarily to receiving at a firewall 100 data from a remote computer 106, embodiments of the invention may also be used to regulate data being sent by a computer apparatus hosting firewall 100 or by a computer apparatus in a computer network secured by firewall 100 to a remote computer 106, or may regulate data being exchanged in any other suitable manner.

In block 110, remote computer 106 sends a negotiation request to a computing device hosting a firewall 100. The computing device may be any suitable computing apparatus, including a computing apparatus dedicated exclusively to hosting the firewall or a multi-purpose computing apparatus that hosts, among other services, a firewall. Exemplary computing devices will be discussed in greater detail below, but it should be appreciated that embodiments of the present invention are not limited to being implemented on any particular computing apparatus or in any particular system of computing apparatuses.

In block 112, security engine 100 receives the negotiation request. In some embodiments of the invention, such as the one depicted in FIG. 1, firewall 100 may be divided into two or more logical parts, an IPsec enforcement engine 102 and a firewall enforcement engine 104, but it should be appreciated that alternative embodiments of the invention may divide the firewall 100 in other ways or may not divide the security engine 100. The IPsec enforcement engine 102 (or any suitable component of security engine 100), in block 114, matches the received negotiation request to the IPsec policies and capabilities of the security engine 100 to determine a security level at which it will communicate with the remote computer 106. This process may primarily consist of comparing the capabilities of the remote computer 106 to the capabilities of the security engine 100, though the process may consist of other steps as well because the determination of a security level may be done in any suitable manner making use of any suitable information. Exemplary processes for making this determination will be discussed in greater detail below, though it should be appreciated that embodiments of the invention are not limited to implementing any specific process.

Once the security engine 100 has, in block 114, compared the information provided by the remote computer 106 to its own capabilities and policies and determined a security level at which it will communicate with remote computer 106, security engine 100 may, in block 116, send a response to remote computer 106 that comprises a list of the types of connection security that should be used for the connection between remote computer 106 and the computing device with which it intends to communicate. The response sent by security engine 100 may also comprise an indicator of which security algorithms should be used by remote computer 106 when securing the connection, and/or any other suitable information.

In block 118, remote computer 106 receives the negotiation response and performs any necessary processing steps for securing the connection. These necessary processing steps may include locally-executed steps such as determining encryption keys for encryption algorithms, or may include exchanging data with the security engine 100, such as exchanging authentication data like usernames and passwords. Any suitable processing steps may be executed by the remote computer 106 at this stage, and it should be appreciated that embodiments of the invention are not limited to performing any particular processing steps or, indeed, any processing steps at all.

Once these steps are completed, remote computer 106, in block 120, begins transmitting to its intended recipient (e.g., a computer apparatus hosting the security engine 100 or a computer apparatus in a computer network protected by the security engine 100). Transmissions may comprise any suitable content, and this first transmission may comprise a request to initiate a connection if the remote computer 106 desires to communicate using a connection-based protocol such as the Transmission Control Protocol (TCP). Alternatively, the first transmission may comprise data if the remote computer 106 desires to communicate using a connectionless protocol such as the User Datagram Protocol (UDP). In block 122, security engine 100 receives the transmission and confirms that it meets the requirements of the negotiated security level for that connection.

In block 124, the firewall enforcement engine 104 receives the transmission and compares it to at least one firewall rule to determine if it should be relayed to its destination (i.e., its intended recipient). Firewall rules may define requirements for transmission to meet in order to be relayed through the firewall. As described above, a firewall rule may be implemented based on any characteristic of the received transmission, including origin or destination address. In some embodiments of the invention, however, firewall rules may also be defined based wholly or partially on connection security levels of the connection over which the transmission was received, or on security characteristics of the data in the transmission. Exemplary processes for determining whether the received transmission matches firewall rules will be discussed in further detail below, though it should be appreciated that embodiments of the invention may make this determination in any suitable manner and are not limited to implementing any particular process.

If it is determined that the transmission matches one or more firewall rules, the transmission is then allowed to pass through the firewall and is relayed to the intended recipient. As discussed above, the intended recipient may be a service or application on the same computing device as the security engine 100 or may be a separate computing device to which the data should be sent.

As discussed above, it should be appreciated that the process shown in FIG. 1 is merely exemplary, as the techniques described herein can integrate firewall rules with other security techniques that employ any suitable process for establishing a secure connection and securely transmitting data via the connection. For example, some embodiments of the invention may implement a security engine 100 that combines Secure Sockets Layer (SSL) with a firewall 104 such that firewall rules of the firewall 104 may filter data based on parameters relating to SSL. As a further example, alternative embodiments of the invention may implement a security engine 100 that combines a data compression engine with a firewall 104 such that firewall rules of the firewall 104 may filter data based on parameters relating to compression (e.g., what compression algorithm was used to compress the data).

Figure 2:
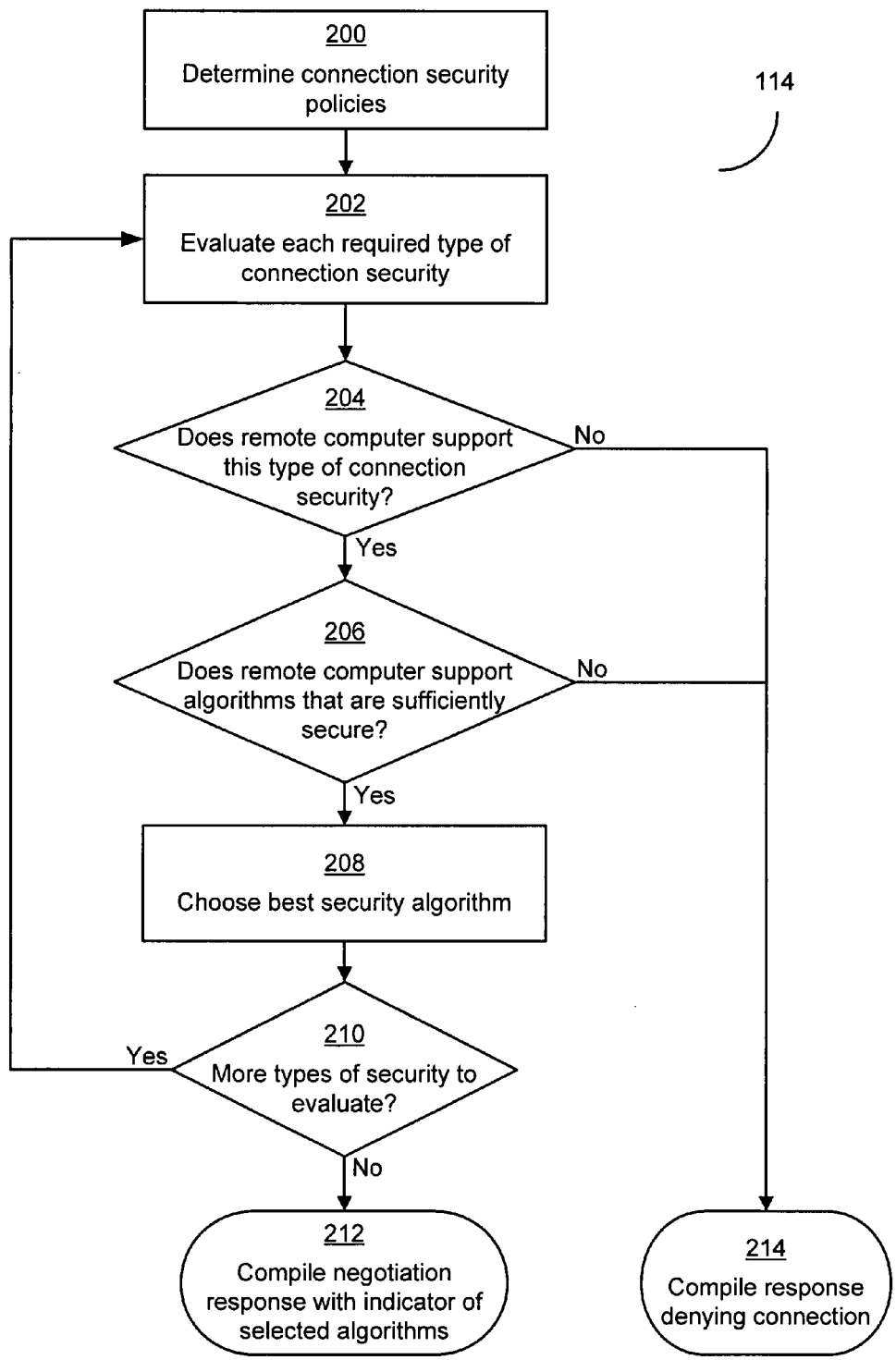
FIG. 2 is a flowchart of an illustrative process of negotiating a connection security level between two computer apparatuses in accordance with one embodiment of the present invention.

FIG. 2 shows an illustrative process for matching connection security capabilities and policies of the security engine 100 with the capabilities of the remote computer 106 (block 114 in the process of FIG. 1). The process of FIG. 2 may begin, in some embodiments of the invention, when a negotiation request is received by the security engine 100 in block 112. This negotiation request may comprise any suitable information. In some embodiments of the invention, a negotiation request transmitted by remote computer 106 may comprise a listing of all the types of connection security supported by remote computer 106. The negotiation request may also, in some embodiments of the invention, comprise a listing of the security algorithms remote computer 106 supports to implement those types of connection security. In other embodiments of the invention, the algorithms supported by remote computer 106 may be transmitted to the computing device hosting security engine 100 in a separate transmission either automatically or upon being requested by security engine 100.

The illustrative process of FIG. 2 begins in block 200, wherein the security engine 100 (e.g., via the IPsec enforcement engine 102) determines its connection security policies for the connection. In some embodiments of the invention, IPsec enforcement engine 102 may maintain a policy or policies of minimum security levels for all connections and/or particular types of connections having characteristics that remote computer 106 must meet. These characteristics may include characteristics regarding remote computer 106 (e.g., addresses such as IP address or subnet mask that identify a computer or a location of a computer) and/or regarding the desired connection based on intended use information contained in the negotiation request (e.g., the type of data to be transmitted and/or the service/application transmitting the data). This policy may be developed in any suitable manner, such as being specified by a security administrator. In some embodiments of the invention, an IPsec connection security policy may be developed automatically based on firewall rules which are in turn based on connection security levels (described below). For example, the IPsec enforcement engine may examine the firewall rules maintained by security engine 100 and determine the minimum level of connection security that meets any firewall rule, or the minimum level that meets a particular rule such as a default rule, and specify that level of connection security as the minimum connection security level in the IPsec policy.

Policies such as these may be based on types of connection security supported by one or both ends of the connection. As discussed above, any suitable type of connection security may be supported by either the remote computer 106 or the security engine 100. Exemplary types of connection security include encryption, authentication, anti-replay, and integrity checking, among others. These types of connection security may be used alone or in combination with one another. Accordingly, a policy of security engine 100 may require that all connections use encryption and connections from some computers be further secured by requiring authentication. Alternatively, a policy of IPsec enforcement engine 102 may require that all connections be encrypted and checked for integrity, but the firewall may "trust" some computers and require only integrity checking and not encryption. As a further exemplary alternative, a policy may require that all connections be encrypted and may not have any exceptions or additional requirements for particular connections. It should be appreciated that any type or types of connection security may be used alone or in any combination to secure connections, and that embodiments of the invention are not limited to requiring any particular type or types of connection security or, indeed, any connection security at all.

It should be further appreciated that, in accordance with some embodiments of the invention, a policy of IPsec enforcement engine 102 may also be more specific than requiring types of connection security. A policy may require a particular algorithm or algorithms be used for all or some connections. A policy may stipulate that for some connections, a single algorithm or a select group of algorithms are required and may require a different algorithm or group of algorithms for other connections. However, it should also be appreciated that, in some embodiments of the invention, a policy may require only that an algorithm supported by the IPsec enforcement engine 102 be used for the connection.

Once IPsec enforcement engine 102 has determined its security policies in block 200, it begins to compare, using the data transmitted with the negotiation request, the capabilities of the remote computer 106 to its own capabilities and policies to determine if the connection may be established. Based on the policy or policies, the IPsec enforcement engine 102 may begin (in block 202) evaluating each type of connection security required by the IPsec policy of the IPsec enforcement engine 102. This process may comprise several steps. First, in block 204, the IPsec enforcement engine 102 may determine whether the remote computer 102 supports that type of connection security. If it does, the process may continue to block 206 wherein the IPsec enforcement engine 102 may determine whether the remote computer 206 supports algorithms that are sufficiently secure. Block 206 may comprise determining what algorithms the remote computer 206 supports for a particular type of connection security by requesting from the remote computer 206 a listing of supported algorithms. Block 206 may additionally or alternatively comprise determining whether the IPsec enforcement engine 102 supports any of the algorithms that the remote computer 106 supports, and/or whether these mutually supported algorithms are sufficiently secure for the connection security policy of IPsec enforcement engine 102. If IPsec enforcement engine 102 does determine that the remote computer 106 and the IPsec enforcement engine 102 both support one or more algorithms that are sufficiently secure, the process continues to block 208 wherein the process selects a "best" security algorithm to use for the connection. This selection may be done in any suitable manner, including, for example, by a ranking of the algorithms and choosing the most secure or by choosing, of the acceptable algorithms, the easiest to implement/use. Through a determination in block 210, the process will continue examining each required or supported type of connection security until all types of connection security have been examined. If all types of connection security are supported by the remote computer 106 with algorithms that are sufficiently secure, IPsec enforcement engine 102 may compile, in block 212, a negotiation response with an indicator of the selected algorithms to be sent in block 116.

If any type of connection security required by IPsec enforcement engine 102 is not supported by remote computer 106, or if any type of connection security is not supported with a sufficiently secure algorithm, IPsec enforcement engine 102 may drop and ignore the connection request or may, in some embodiments of the invention, compile in block 214 a negotiation response that indicates to remote computer 106 that the connection request has been denied. This response may comprise any suitable information, including an indicator of why the connection has been denied (e.g., what type of connection security is required and not supported). It should be appreciated, however, that in some embodiments of the invention the response indicating that the connection request has been denied may be compiled and transmitted, but may not reach the remote computer 106 as the security engine 100 may have one or more policies in place preventing the transmission of error messages. This may be done to improve security by not indicating to a remote terminal 106 when errors have occurred because, with that information, an attacker using remote computer 106 may be able to determine operational characteristics of the security engine 100 and may be able to exploit that information to attack the security engine 100.

In alternative embodiments of the invention, when the negotiation process is unsuccessful, IPsec enforcement engine 102 may approve a connection to remote computer 106 that is less secure than its policies require but may, for example, restrict what remote computer 106 may transmit over the connection or may, for example, restrict to where it may transmit data or from where it may receive data, or may take any other suitable action.

It should be appreciated that the process of FIG. 2 is merely illustrative, and that other processes are possible. Further, it should be appreciated that other embodiments of the invention may instead transmit IPsec enforcement engine 102's capabilities and policies to remote computer 106 and have the remote computer 106 determine a security level for the connection.

Figure 3:
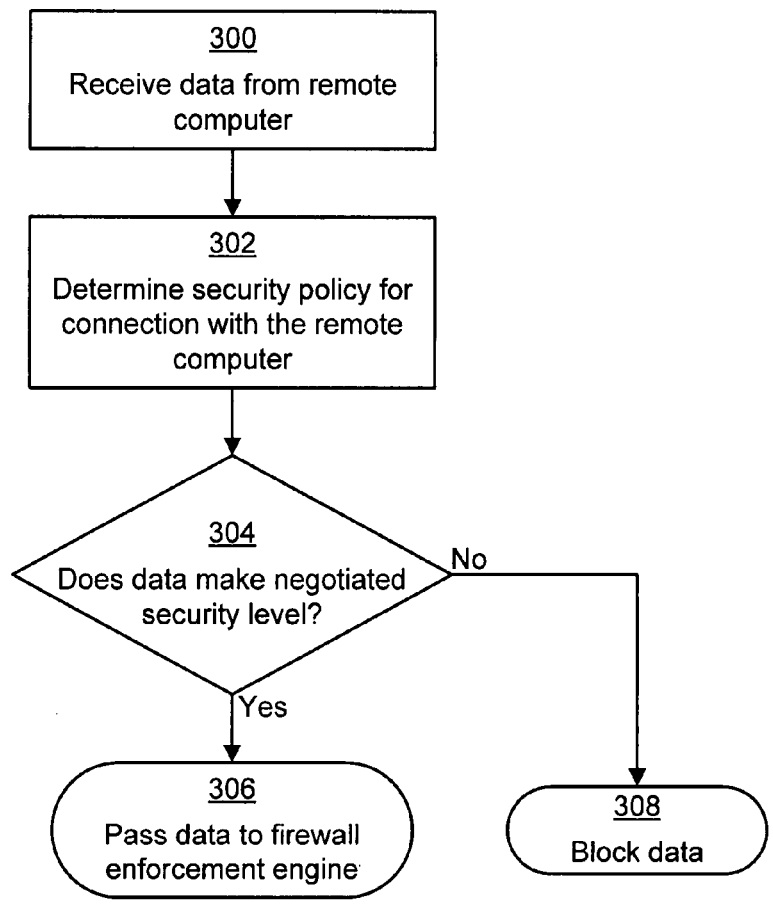
FIG. 3 is a flowchart of an illustrative process of confirming that received transmissions meet a negotiated security level in accordance with one embodiment of the present invention.

FIG. 3 shows an exemplary process (as in block 122) for processing a received transmission to confirm that remote computer 106 has conformed to the negotiated security level for the connection, and/or to confirm that a third party (e.g., an attacker) is not trying to transmit data as if it were being sent by remote computer 106. This confirmation may be done in any suitable manner, and it should be appreciated that embodiments of the invention are not limited to the specific process shown in FIG. 3.

In block 300, IPsec enforcement engine 102 receives a transmission from remote computer 106 and, in block 302, determines what negotiated security policy should be applied to the received transmission. This determination may be made in any suitable manner, including, for example, by retrieving from a listing of negotiated security policies the negotiated security policy for the connection based on an address or other characteristic of remote computer 106.

In block 304, the process confirms that the transmission meets the negotiated security level. This confirmation may comprise decrypting the transmission and/or confirming that it is using the correct encryption process, authenticating the remote computer 106, checking the integrity of the data, checking sequence numbers of the data as part of an anti-replay algorithm, or any other suitable method of confirming. If the received transmission does not meet the negotiated level of security, in block 308 the transmission may be dropped/deleted and not relayed to its intended recipient. Further, IPsec enforcement engine 102 may, in some embodiments of the invention, transmit an indicator that the transmission was dropped to the remote computer 106 to inform it that it is not transmitting the transmission appropriately (i.e., according the negotiated security level).

If the received transmission does meet the negotiated level of security, however, in block 306 at least some information relating to the transmission may be relayed to the firewall enforcement engine 104. The transmission may be relayed as it was received, or it may be relayed in any other suitable manner. For example, in some embodiments of the invention, the data may be decrypted prior to being relayed, and/or it may be placed inside a data structure along with information regarding the type(s) of connection security used for its connection. In some embodiments of the invention, the data structure may further comprise an indicator of what algorithms were used for each of the types of connection security used for the connection.

As mentioned above, it should be appreciated that embodiments of the invention are not limited to implementing the specific illustrative process of FIG. 3 and may implement any suitable process for confirming that the remote computer 106 is conforming to the negotiated security level.

Figure 4:
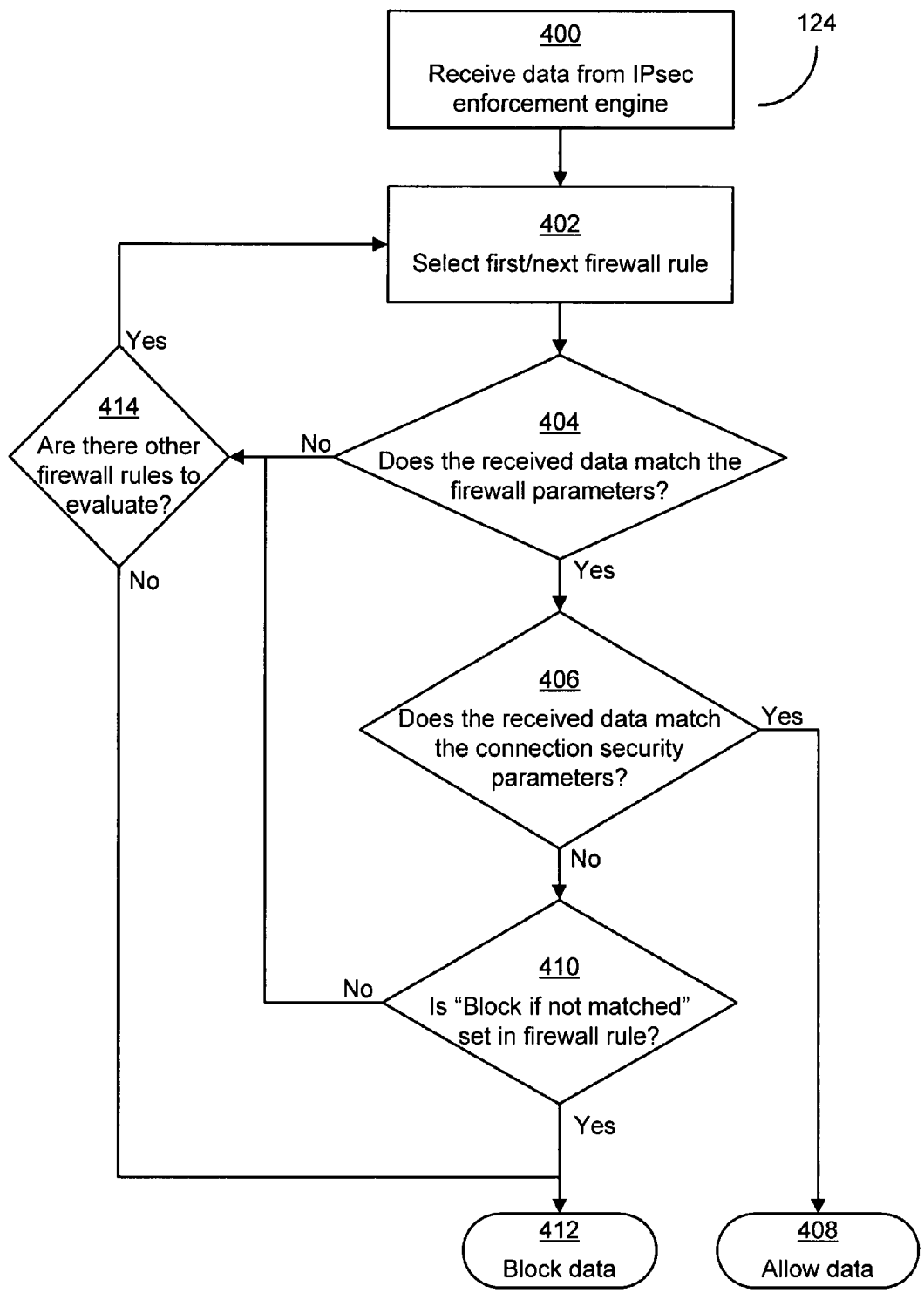
FIG. 4 is a flowchart of an illustrative process of matching received transmissions to firewall rules maintained by a security engine in accordance with one embodiment of the present invention.

As discussed above, once the transmission has been received and passed to the firewall enforcement engine 104 (or any suitable component of the firewall), the transmission is compared to firewall rules maintained by the firewall to determine whether the transmission should be relayed to its intended recipient, as in block 124. FIG. 4 shows an illustrative process for making this determination, though it should be appreciated that other processes are possible.

The illustrative process of FIG. 4 begins in block 400 when a transmission is received from the IPsec enforcement engine 102 (or from any other suitable component of security engine 100 or the computer system in which security engine 100 is operating). In block 402, the process begins comparing the received transmission to firewall rules maintained by security engine 100. As discussed above, these firewall rules are typically based on one or more characteristics of the received transmission. These characteristics may include any of the characteristics on which traditional firewalls filter transmissions, such as origin port/address, destination port/address, protocol by which the data is being sent, service or application sending or receiving data, size of the data being received, or any other suitable characteristic. In some embodiments of the invention, these characteristics may also include characteristics which are not evaluated in traditional firewall rules. In some embodiments of the invention, a firewall rule may comprise or consist of filtering parameters based on types of connection security used for a connection, either alone or in combination with any other firewall filtering characteristics. As discussed above, firewall rules may be based on any suitable type or types of connection security that may be negotiated for a connection. Exemplary types of connection security include encryption, authentication, anti-replay, and integrity checking, among others. A firewall rule may alternatively or additionally comprise requirements on what algorithm or algorithms are acceptable for a particular type of connection security, may require a level of security that an algorithm must meet, or may be based on any other suitable characteristic of connection security.

In one embodiment of the invention, connection security parameters of a firewall rule may comprise an identity of the remote computer 106 that was determined by the IPsec enforcement engine 102. For example, a firewall rule may comprise a connection security parameter on authentication data (e.g., a username of the user of remote computer 106) collected during an authentication process. In this manner, rather than depending on an origin address of received data to determine an identity of the remote computer 106, in some embodiments of the invention the firewall may filter received data based on the authenticated identity of the remote computer 106 and/or the identity of the user of the remote computer 106. Alternatively or additionally, embodiments of the invention may establish firewall rule parameters on any information received from or assigned to remote computer 106 during a security negotiation process such as the matching process 114 described above.

Types of connection security may be used in firewall rules either alone, in any suitable combination with one another, and/or in any suitable combination with other filter characteristics (examples of which are described above as being used with conventional firewalls). As with connection security policies, one firewall rule may require that most connections use authentication and another firewall rule may stipulate that connections from some computers be further secured by requiring encryption. Alternatively, a broad firewall rule may require that most connections be encrypted and checked for integrity, but a narrower firewall rule that takes precedence over the broad firewall rule may require only integrity checking and not encryption if the connection is being made to a particular computer behind the firewall or to a particular service transmitting or receiving the data. As a further exemplary alternative, a firewall rule may require that all connections be encrypted and the firewall may not have any exceptions or additional requirements for particular connections.

Firewall rules are typically, though not necessarily, enforced in a specific order, though the specific order may be any suitable order. In one embodiment, the firewall may, for example, have one or more broad rules that define the firewall's default policy and have a number of narrower rules that define exceptions to that policy, and may evaluate rules from broad to narrow to determine if the received transmission should be relayed. Thus, a firewall may examine multiple rules as part of this determination process.

In block 402, the process selects the first rule in the order by which firewall rules should be evaluated. In block 404, the process determines whether the received transmission matches the firewall parameters of this firewall rule. The firewall parameters may be based on any characteristic of the transmission discussed above (such as origin or destination port/address, size, service, etc.) or any other suitable characteristic, and includes all characteristics evaluated by the firewall except for any relating to IPsec. If the transmission does not meet any of these parameters, the process may, in some embodiments of the invention, return to block 402 and select the next firewall rule in the order for evaluation. If the data does meet all the parameters, however, the process may continue to block 406 wherein it compares the connection security level of the connection over which the data was received to the connection security parameters of the firewall rule. The connection security information used in this comparison may have been received from the IPsec enforcement engine 102 with the transmission (e.g., as part of the data structure described above), or may be retrieved from a data store of connection security levels based on a characteristic or characteristics about the transmission (e.g., origin address), or in any other suitable way. If the connection security level of the connection meets all the requirements of the firewall rule, then in block 408 the transmission may be allowed through the firewall and relayed to its intended recipient.

If the connection security level does not meet the requirements of the connection security level, however, in some embodiments of the invention the process may continue to block 410. In these embodiments of the invention, firewall rules may have a field for a "Block if not matched" flag for connection security parameters. In these embodiments, if received data meets the requirements of the firewall parameters of a firewall rule but does not meet the requirements of the connection security parameters, then the data may be blocked in block 412 without examining other firewall rules. By doing this, the firewall enforcement engine 104 may save processing time by not examining firewall rules when it may infer that the requirements of the firewall rules may not be met. Additionally, security may be improved as the "Block if not matched" technique may be used to prevent a similar firewall rule lower in a rule hierarchy or rule order from being evaluated. As described above, the blocking of data may be done in any suitable manner, such as by simply dropping/deleting the data or by sending an indicator of the blockage to the sender. In some embodiments of the invention, the "Block if not matched" flag may not be a particular data field in the rule, but may instead be stored alongside a data value in another data field of the firewall rule, as will be discussed in greater detail below.

If, however, the "Block if not matched" flag is not set, then the process continues to block 414, wherein the process will determine if there are more firewall rules to be evaluated. If there are more rules, the process will continue evaluating firewall rules by returning to block 402 and selecting the next firewall rule in the order. If there are no more firewall rules to evaluate, the process may block the data in block 412 in any suitable manner, as described above.

In some embodiments of the invention, a "Block if not matched" flag may be set for the entire security engine 100, in addition to or instead of for individual rules, such that if the requirements of firewall parameters of any rule are met while the connection security parameters of that rule are not met, the process will stop evaluating rules. In some embodiments of the invention, the "Block if not matched" flag may also apply to firewall parameters, such that execution may stop at block 404 if the firewall parameters of a rule are not met. It should be appreciated that any "Block if not matched" technique to save on rule evaluation processing may be implemented in any suitable manner and embodiments of the invention are not limited to implementing the technique in any particular way or, indeed, implementing the technique at all.

It should be appreciated that embodiments of the invention may determine whether a received transmission meets one or more firewall rules in any suitable manner, and are not limited to implementing the illustrative process shown in FIG. 4.

Firewall rules such as those evaluated by the exemplary process shown in FIG. 4 may be stored by security engine 100 in any suitable manner, including by a schema such as the one shown in FIG. 5. FIG. 5 shows a data structure 500 comprising a number of data fields and values that may be used in a firewall rule such as those maintained by security engine 100. It should be appreciated that a firewall rule may comprise any number of required and/or optional data fields, and that firewall rules maintained by embodiments of the invention are not limited to implementing any of the data fields shown in FIG. 5.

Data fields shown in FIG. 5 include any parameters on which the security engine 100 may make its decision to allow or block data. The ACTION field indicates what the security engine 100 should do if received data matches the remainder of the fields (e.g., whether it should be blocked or allowed). A firewall rule may also be enabled or disabled by a firewall administrator, and thus the firewall rule may comprise an ACTIVE field storing a "True" or "False" value. The firewall rule may also store a name for itself (the NAME field) and/or a description of its functionality (the DESC field) so that it might be distinguished to a user or administrator. The name field may take a definite value, or may take an indefinite value such as a reference to a text value in a dynamic linked library, such in FIG. 5. This latter approach may be taken in cases where different text values may be used in different circumstances, such as in different locations where different languages may be used. By referencing the text instead of storing the text directly, the firewall rule may be more readily adapted to implementation in different circumstances. Either technique (definite or indefinite values) may also be employed for the description of the firewall rule (the DESC field).

The firewall rule may also comprise one or more filtering parameters. A firewall rule may store an indicator of what type of traffic it applies to, either inbound or outbound (i.e., into the computer or computer network protected by the firewall or out of the computer or computer network) (the DIR field). The firewall rule may further comprise an indicator of what protocol or protocols it operates on (the PROTOCOL field), stored in any suitable way such as by the number assigned to the protocol by the Internet Assigned Numbers Authority (IANA). In FIG. 5, the PROTOCOL field has a value of 6, which corresponds to the Transmission Control Protocol (TCP). The local port used by the data may also be regulated by the firewall 100 (the LPORT field). This may be used to limit the type of data being transmitted, because certain types of data tend to be transmitted over certain ports, and may also serve to limit the number of ports open on the computer or computer network. The LPORT field may take any appropriate value (e.g., TCP ports are numbered from 0 to 65535). The firewall rule may also store an indicator of what range of remote addresses (the address of the sender/receiver) to which it applies, for both Internet Protocol Version 4 (IPv4) (the RA4 field) and Internet Protocol Version 6 (IPv6) (the RA6 field). These fields may take any suitable value, including a specific address or an indicator of a type of address (e.g., to restrict the firewall rule to an address in the same subnet as the security engine 100, the indicator may be LOCALSUBNET). A firewall rule may comprise an indicator of what service may send or receive the data (the SVC field), which may comprise a name for the service (e.g., XYZService), or a particular application that is sending or receiving the data (the APP field) with a full or relative path to the application's executable (e.g., %SYSTEMROOT%\system32\svchost.exe).

As discussed above, in some embodiments of the present invention, firewall rules may also comprise requirements for connection security levels. These may be stored in any suitable manner, including as a single field taking multiple values indicating levels of connection security or as multiple fields each relating to a type of connection security and storing a value indicating whether that type is required (e.g., a true/false value) or what type of algorithm should be used for that type of connection security. FIG. 5 shows the former method, wherein the firewall rule has a SECURITY field taking multiple different values. The SECURITY field may take any suitable value, such as "Authenticate" for firewall rules that require that the transmitting computer authenticate with the security engine 100 before the data will be allowed through the firewall. The SECURITY field may also store a value of "StrictAuthenticate" for a stricter form of authentication, a value of "AuthenticateIntCheck" for authentication paired with integrity checking, a value of "AuthenticateEncrypt" for authentication paired with encryption, or any other suitable value. In embodiments of the invention, the SECURITY field may also be used as part of the "Block if not matched" rule mentioned above, by taking a value that indicates whether further evaluation should be blocked if the security level specified is not met. For example, the values for SECURITY previously described may indicate that evaluation should be blocked, while values such as "CAuthenticate" (for continue/Authenticate), "CStrictAuthenticate," "CAuthenticateIntCheck," or "CAuthenticateEncrypt" may be stored to indicate that evaluation should continue. In some embodiments of the invention, these values indicating that execution should continue may be stored in a different field that also signals that execution should continue, such as in a SECURITY2 field. Alternative embodiments of the invention may store values indicating a "Block if not matched" state in any other suitable manner.

As discussed above, in some embodiments of the invention, IPsec policies may be developed based on firewall rules. In some of these embodiments, the IPsec enforcement engine 102 may develop these policies on its own by querying the firewall rules. In some embodiments of the invention, the firewall enforcement engine 104 will create these policies in the IPsec enforcement engine 102 based on the firewall rules. A firewall rule may therefore have a data field such as AUTOGENIPSEC to inform the firewall enforcement engine whether it should create IPsec policies based on that firewall rule. This data field may take a true or false value, or any other suitable value.

Firewall rules may also store other data fields and other values not shown in FIG. 5. For example, a firewall rule may have a PROFILE field indicating to which computing profile it applies. A computing profile may be set by a user or an operating system to indicate an environment that the computer apparatus is in, such that network policies such as firewall and IPsec policies, or other network settings, may be set appropriately. In this manner, some firewall rules may only be applied to some environments/profiles. The PROFILE field may take any suitable value, including "Domain," which may indicate that the rule applies when the computer apparatus is in use in a managed network domain, "Private," which may indicate that the rule applies when the computer apparatus is in use in a private network such as a home network, and "Public," which may indicate that the rule applies when the computer apparatus is in use in a public network such as a commercial network (e.g., in a coffeehouse). A firewall may also store a GROUP indicator, which may link together two or more firewall rules that relate to a particular experience or feature on the computer apparatus (e.g., an application). In this manner, all firewall rules relating to a particular experience or feature on the computer apparatus may be simultaneously enabled or disabled when referred to as a group, or other suitable group operations may be performed on the firewall rules.

Firewall rules such as the one shown in the schema of FIG. 5 may be created or managed in any suitable manner. For example, a command line interface may be used to create firewall rules that takes as input various parameters that should be used in creating the rule. For example, a command line interface such as

```
netsh advfirewall firewall add rule dir=in action=allow name=test
    Localport=80 protocol=tcp program=c:\sfpcopy.exe
    security=authenticate
``` may be used. In this example, netsh may be a program that performs many functions related to network administration, and takes as input values indicating what particular function should be performed (e.g., "advfirewall firewall add rule" indicates that netsh should use its advanced firewall functionality to add a rule to the firewall). The remaining input, in the example, relate to the parameters that should be used in the new firewall rule, corresponding to DIR, ACTION, NAME, LPORT, PROTOCOL, APP, and SECURITY, discussed above. It should be appreciated that embodiments of the invention may not implement a command such as netsh and may instead implement any other suitable command line interface.

Figure 6:
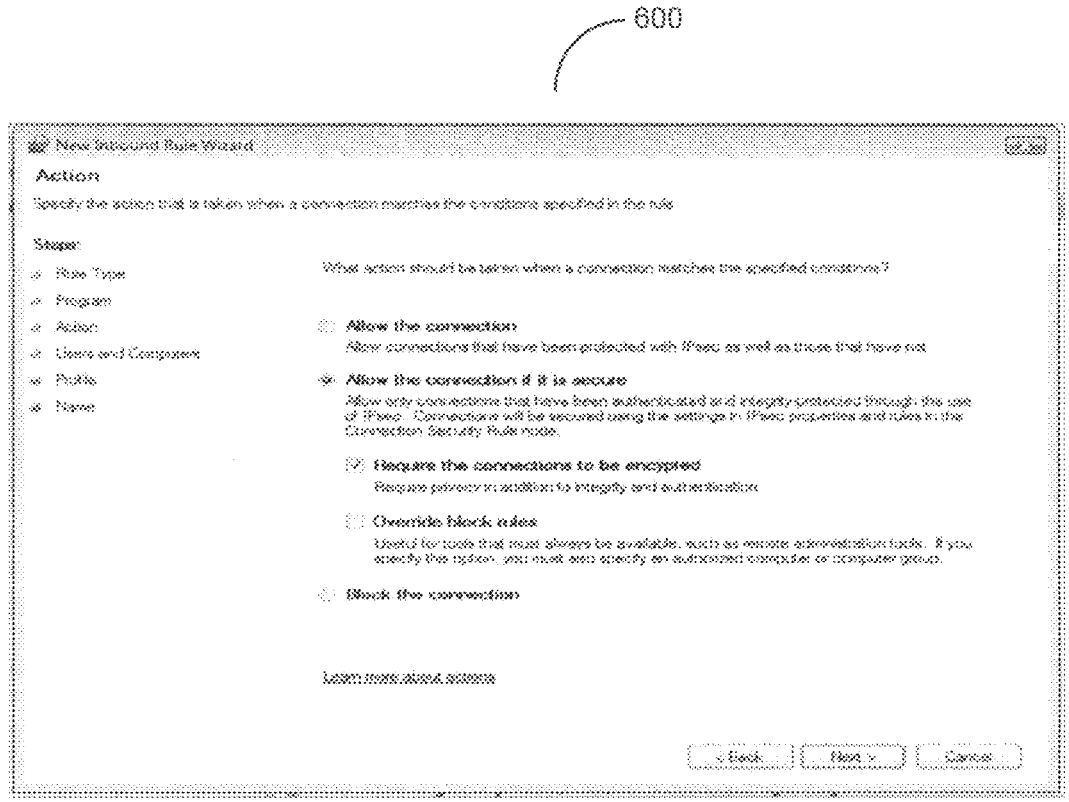
FIG. 6 is an exemplary graphic interface that may be used to create or manage firewall rules in accordance with one embodiment of the present invention.

As an alternative to the command line interface, or in addition to the command line interface, any suitable graphical interface may be used to create or manage firewall rules, such as the one shown in FIG. 6. FIG. 6 shows one step of a process of creating a firewall rule using a graphical interface. Looking on the left side of interface 600, the various steps may be seen, such as "Rule Type," "Program," "Action," "Users and Computers," "Profile," and "Name." In the step shown, "Action," a user may indicate whether to block or allow data that fits the rule, as well as indicate whether to allow or block the data based on connection security parameters such as whether the connection is authenticated, encrypted, and/or integrity-checked. It should be appreciated that any suitable graphic interface may be used for creating firewall rules, and that embodiments of the invention are not limited to implementing the graphic interface shown in FIG. 6.

The aspects of the present invention described herein may be implemented on any of numerous computer system configurations and are not limited to any particular type of configuration. FIGS. 7-10 show various computer systems in which embodiments of the invention may act, though others are possible.

Figure 7:
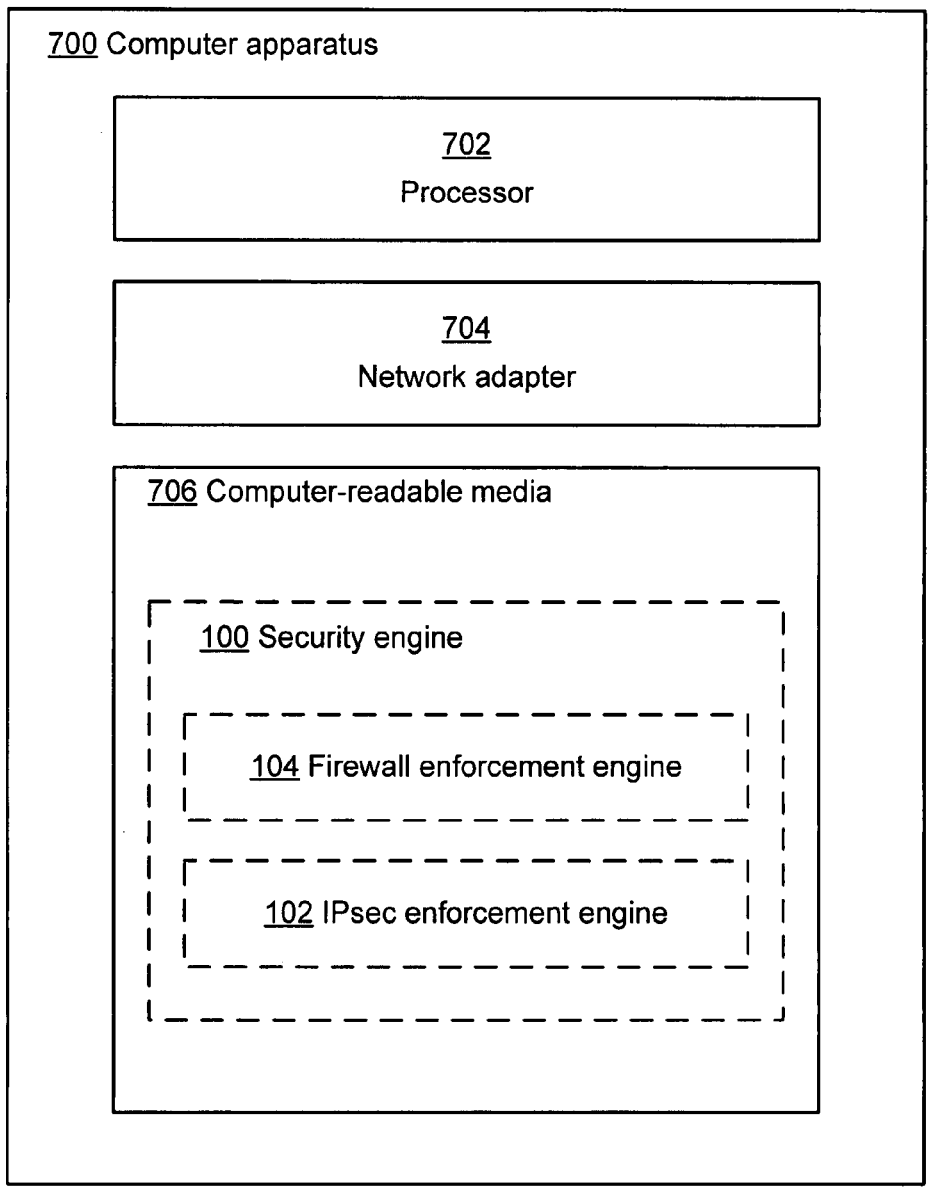
FIG. 7 is an exemplary computer apparatus that may be used in accordance with one embodiment of the present invention.

FIG. 7 shows a computer apparatus 700 which may host security engine 100 and that may be used in accordance with one or more embodiments of the invention. It should be appreciated that FIG. 7 is intended to be neither a depiction of necessary components for a computing device to operate as a computer apparatus with embodiments of the invention, nor a comprehensive depiction. As discussed above, any suitable computing device may be used as a computer apparatus 700 to host a security engine 100. Computer apparatus 700 may be a computing device designed for multiple purposes and for use by a user, such as a desktop personal computer, a laptop personal computer, a server, a personal digital assistant (PDA), a smart/mobile telephone, a web-enabled television set, or any other suitable electronic device. Alternatively, computer apparatus 700 may be any computing device not intended for typical use by a user or intended for a single purpose or limited purposes, such as a server, a rack-mounted networking device, or a standalone networking device such as a switch, hub, router, access point, hardware firewall, or any other suitable electronic device.

As shown in FIG. 7, computer apparatus 700 comprises a processor 702, a network adapter 704, and computer-readable media 706. Network adapter 704 may be any suitable hardware and/or software to enable computer apparatus 700 to communicate with any other suitable computing device over any suitable computing network. The computing network may be any suitable wired and/or wireless communication medium or media for exchanging data between two or more computers, including the Internet. Computer-readable media 706 may be adapted to store data to be processed and/or instructions to be executed by processor 702. Processor 702 enables processing of data and execution of instructions. The data and instructions may be stored on the computer-readable media 706 and may, for example, enable communication between components of the computer apparatus 700.

In accordance with some embodiments of the invention, the data and instructions stored on computer-readable media 706 may comprise a security engine 100, as described above. Security engine 100 may be implemented in any suitable manner and may, for example, be divided into multiple logical parts, such as an IPsec connection security enforcement engine 102 and a firewall enforcement engine 104.

Figure 8:
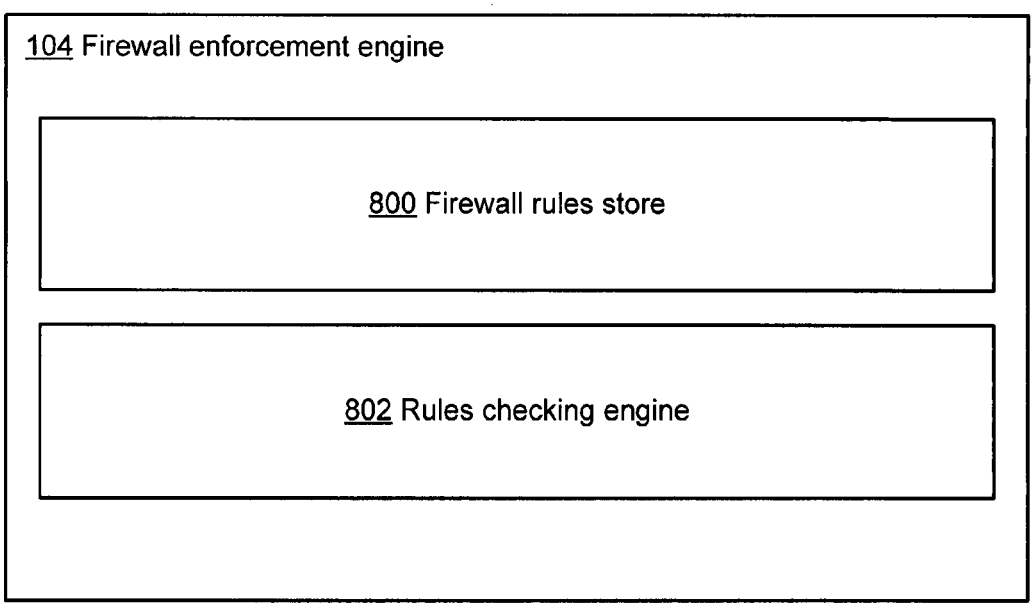
FIG. 8 is an exemplary firewall enforcement engine that may be used in a security engine implemented in accordance with one embodiment of the present invention.
Figure 9:
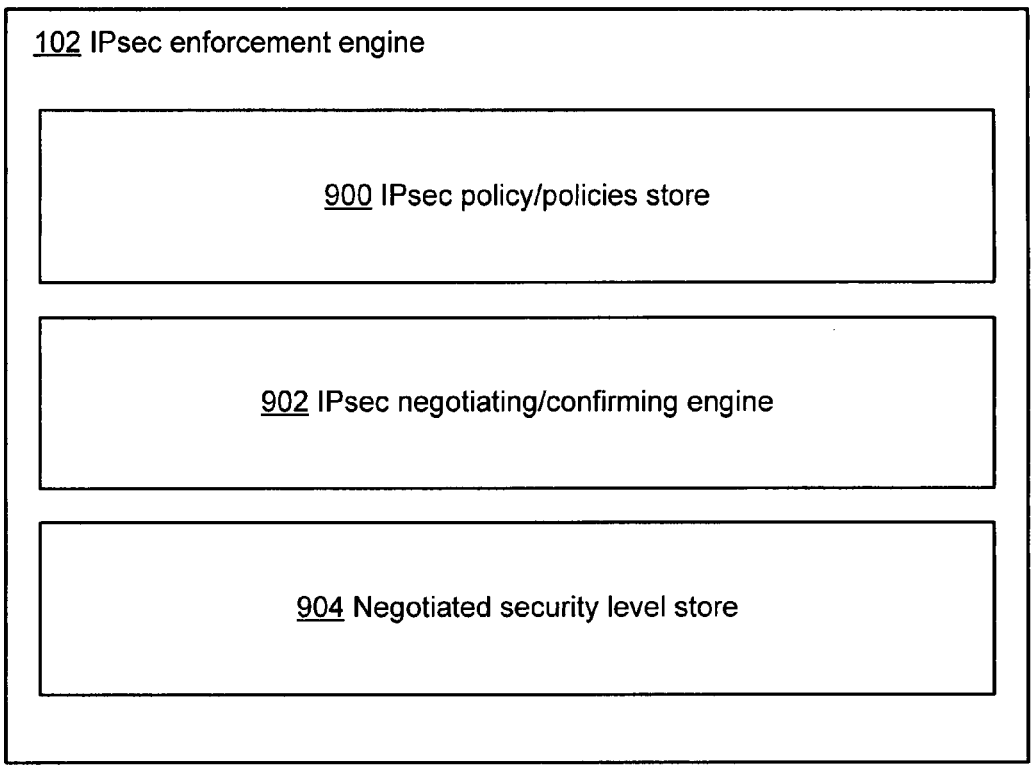
FIG. 9 is an exemplary connection security enforcement engine that may be used in a security engine implemented in accordance with one embodiment of the present invention.

As discussed above, security engine 100 or the parts thereof may be implemented in any suitable manner. FIGS. 8 and 9 show exemplary implementations for a firewall enforcement engine 104 and an IPsec enforcement engine 102, respectively. Again, it should be appreciated that FIGS. 8 and 9 are intended to be neither a depiction of necessary components for a firewall enforcement engine 102 or an IPsec enforcement engine 102 to act in accordance with embodiments of the invention, or a comprehensive depiction.

As shown in FIG. 8, firewall enforcement engine 104 comprises a firewall rules store 800 for storing firewall rules that have been implemented by security engine 100. These rules, as discussed above, may be active or inactive, and may comprise multiple different parameters. These rules may be stored in any suitable manner, such as in a flat file, a database, or any other suitable data storage method. Firewall enforcement engine 104 may further comprise a rules checking engine 802 for determining whether received data meets the requirements of one or more firewall rules. Rules checking engine 802 may implement any suitable process for making this determination, including process 124 described above.

FIG. 9 shows an exemplary embodiment of an IPsec enforcement engine 102 that may be used in accordance with embodiments of the invention. As shown, IPsec enforcement engine 102 comprises an IPsec policy/policies store 900 for storing a policy or policies by which the IPsec enforcement engine will approve or deny connection requests during negotiation. IPsec enforcement engine 102 further comprises an IPsec negotiating/confirming engine 902 for determining a negotiated connection security level and for confirming that received data meets that negotiated security level. IPsec negotiating/confirming engine 902 may implement any suitable process or processes for negotiating a security level and confirming that data meets that level, such as processes 114 and 122 described above. IPsec enforcement engine may further comprise a negotiated security level store 904 in which it may store indicators of security levels that have been negotiated and may query the negotiated security level store 904 during a confirmation process such as process 122. The negotiated security levels may be stored in any suitable manner, including in a flat file, database, or any other suitable data storage method.

As discussed above, it should be appreciated that security engine 100 may be implemented in any suitable manner, and embodiments of the invention are not limited to implementing the exemplary embodiments of security engine 100 shown in FIGS. 7-9.

Figure 10A:
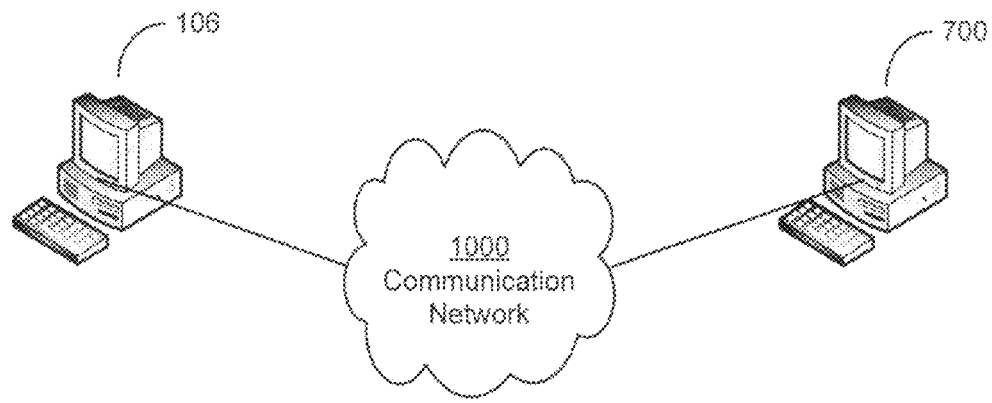
FIG. 10A is an exemplary computer system on which embodiments of the invention may be implemented.

Computer apparatus 700 may be disposed with a computer system and connected to a computer network. FIG. 10A shows one exemplary computer system in which embodiments of the invention may act, though others are possible. In FIG. 10A, computer apparatus 700 is connected to a communication network 1000. As discussed above, communication network 1000 may be any suitable wired and/or wireless communication medium or media for exchanging data between two or more computers, including the Internet. In FIG. 10A, computer apparatus 700 is connected to remote computer 106 through communication network 1000. In the embodiment of FIG. 10A, remote computer 106 may be communicating directly with computer apparatus 700. Computer apparatus 700 is, therefore, a terminal point of the connection, and security engine 100 may only be securing computer apparatus 700 and not any other computing devices in the network. When data received from remote computer 106 is received and approved, then it may be provided directly to a process or application on computer apparatus 700 and not relayed to another device over a network. Similarly, outbound data being sent from computer apparatus 700 to remote computer 106 through the security engine 100 may be received directly from a process or application and not over a network from another device.

Figure 10B:
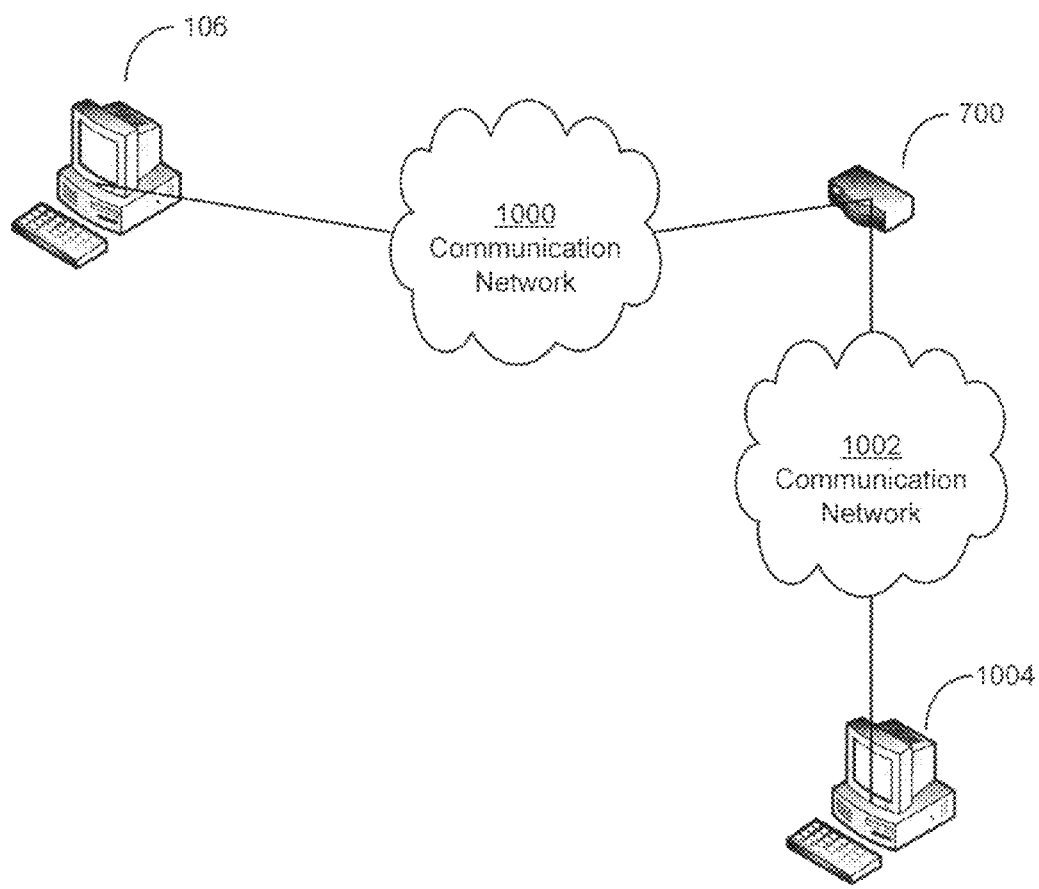
FIG. 10B is an exemplary computer system on which embodiments of the invention may be implemented.

Alternatively, computer apparatus 700, as discussed above, may be a single-purpose or limited-purpose device disposed within a computer network protecting multiple computers. Such an embodiment is shown in FIG. 10B. In FIG. 10B, computer apparatus 700 is a stand-alone device such as a switch, hub, router, access point, hardware firewall, or other suitable electronic device. Computer apparatus 700, as in FIG. 10A, may be connected to remote computer 106 through a communication network 1000, but may also be connected to a communication network 1002. Just as communication network 1000, communication network 1002 may be any suitable wired and/or wireless communication medium or media for exchanging data between two or more computers, including the Internet. Computing device 1004 may be connected to communication network 1002, and may be being protected by firewall 100 on computer apparatus 700. In this manner, for computing device 1004 to send or receive data from certain computers, the data must be examined by security engine 100 on computer apparatus 700 before it is relayed to either computing device 1004, in the case of inbound data, or another computer such as remote computer 106, in the case of outbound data.

It should be appreciated that embodiments of the invention are not limited to operating in the exemplary computer systems shown in FIGS. 10A and 10B, and that embodiments of the invention may be implemented in any suitable computer system. Additionally, though remote computer 106 and computer apparatus 700 are shown in FIG. 10A as desktop computers, and remote computer 106 and computing device 1004 are shown in FIG. 10B as desktop computers, these computing devices may be implemented as any suitable computing device, including a desktop personal computer, a laptop personal computer, a server, a personal digital assistant (PDA), a smart/mobile telephone, a web-enabled television set, or any other suitable electronic device.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method for configuring a firewall for use in a computer system that comprises at least one first device disposed inside the firewall and at least one second device disposed outside the firewall, the method comprising an act of:
   (A) obtaining information on a connection security policy regulating connections in the computer system between the at least one first device and the at least one second device, the connection security policy specifying as a constraint at least one connection security level that can be established for connections between the at least one first device and the at least one second device;
   (B) configuring the firewall with at least one rule for the firewall that determines at least one filtering function that the firewall performs on communications between the at least one first device and the at least one second device, wherein the at least one rule employs at least one filtering parameter that is based on the at least one connection security level specified as the constraint of the connection security policy regulating connections in the computer system, the at least one filtering parameter not being uniquely related to a connection between the at least one first device and the at least one second device.

2. The method of claim 1, wherein the at least one filtering parameter blocks communications when no security level is established for the connection between the at least one first device and the at least one second device.

3. The method of claim 1, wherein the at least one filtering parameter relates to whether communications over the connection between the at least one first device and the at least one second device are authenticated.

4. The method of claim 1, wherein the at least one filtering parameter relates to whether integrity checking is performed for communications over the connection between the at least one first device and the at least one second device.

5. The method of claim 1, wherein the at least one filtering parameter relates to whether communications over the connection between the at least one first device and the at least one second device are encrypted.

6. The method of claim 1, wherein the at least one rule for the firewall comprises a plurality of rules comprising at least a first rule and a second rule, wherein the first rule comprises at least two filtering parameters comprising a first filtering parameter and a second filtering parameter, and wherein;
   when the first and second filtering parameters are met for an evaluated communication between the first and second devices, the first rule results in the evaluated communication being allowed to pass through the firewall;
   when the first filtering parameter is met and the second filtering parameter is not met for the evaluated communication, the evaluation of the first rule results in the evaluated communication being further evaluated by the second rule to determine whether to allow the evaluated communication to pass through the firewall; and
   when the first filtering parameter is not met for an evaluated communication between the first and second devices, the evaluation of the first rule results in the evaluated communication being blocked by the firewall without further evaluation by the second rule.

7. The method of claim 1, wherein the act (B) is performed by an administrator of the firewall.

8. The method of claim 1, wherein the firewall comprises a configuration interface, and wherein the act (B) is performed by the configuration interface.

9. At least one computer readable storage medium encoded with a plurality of instructions that, when executed, perform a method for use in a computer system that comprises a firewall, at least one first device disposed inside the firewall and at least one second device disposed outside the firewall, the method comprising an act of:
   (A) configuring the firewall with at least one rule for the firewall that determines at least one filtering function that the firewall performs on communications between the at least one first device and the at least one second device, wherein the at least one rule employs at least one filtering parameter that is based on at least one connection security level specified as a constraint of a connection security policy regulating connections in the computer system between the at least one first device and the at least one second device, the at least one filtering parameter not being uniquely limited to any specific connection.

10. The at least one computer readable storage medium of claim 9, wherein the at least one filtering parameter blocks communications when no security level is established for the connection between the at least one first device and the at least one second device.

11. The at least one computer readable storage medium of claim 9, wherein the at least one filtering parameter relates to whether communications over the connection between the at least one first device and the at least one second device are authenticated.

12. The at least one computer readable storage medium of claim 9, wherein the at least one filtering parameter relates to whether integrity checking is performed for communications over the connection between the at least one first device and the at least one second device.

13. The at least one computer readable storage medium of claim 9, wherein the at least one filtering parameter relates to whether communications over the connection between the at least one first device and the at least one second device are encrypted.

14. The at least one computer readable storage medium of claim 9, wherein the at least one rule for the firewall comprises a plurality of rules comprising at least a first rule and a second rule, wherein the first rule comprises at least two filtering parameters comprising a first filtering parameter and a second filtering parameter, and wherein;
   when the first and second filtering parameters are met for an evaluated communication between the first and second devices, the first rule results in the evaluated communication being allowed to pass through the firewall;
   when the first filtering parameter is met and the second filtering parameter is not met for the evaluated communication, the evaluation of the first rule results in the evaluated communication being further evaluated by the second rule to determine whether to allow the evaluated communication to pass through the firewall; and
   when the first filtering parameter is not met for an evaluated communication between the first and second devices, the evaluation of the first rule results in the evaluated communication being blocked by the firewall without further evaluation by the second rule.

15. A device for use in a computer system that comprises a firewall, at least one first device disposed inside the firewall and at least one second device disposed outside the firewall, the device comprising:
   at least one processor programmed to
      receive information on at least one connection security level specified as a constraint of a connection security policy regulating connections in the computer system between the at least one first device and the at least one second device, the at least one connection security level being able be established for a connection between the at least one first device and the at least one second device;

based on the information on the at least one connection security level, configure the firewall with at least one rule for the firewall that determines at least one filtering function that the firewall performs on communications between the at least one first device and the at least one second device, wherein the at least one rule employs at least one filtering parameter identifying the at least one connection security level specified as the constraint of the connection security policy, the at least one filtering parameter having at least one value that is not uniquely limited to a connection between a first device of the at least one first device and a second device of the at least one second device.

16. The device of claim 15, wherein the at least one filtering parameter blocks communications when no security level is established for the connection between the at least one first device and the at least one second device.

17. The device of claim 15, wherein the at least one filtering parameter relates to whether communications over the connection between the at least one first device and the at least one second device are authenticated.

18. The device of claim 15, wherein the at least one filtering parameter relates to whether integrity checking is performed for communications over the connection between the at least one first device and the at least one second device.

19. The device of claim 15, wherein the at least one filtering parameter relates to whether communications over the connection between the at least one first device and the at least one second device are encrypted.

20. The device of claim 15, wherein the at least one rule for the firewall comprises a plurality of rules comprising at least a first rule and a second rule, wherein the first rule comprises at least two filtering parameters comprising a first filtering parameter and a second filtering parameter, and wherein;

when the first and second filtering parameters are met for an evaluated communication between the first and second devices, the first rule results in the evaluated communication being allowed to pass through the firewall;

when the first filtering parameter is met and the second filtering parameter is not met for the evaluated communication, the evaluation of the first rule results in the evaluated communication being further evaluated by the second rule to determine whether to allow the evaluated communication to pass through the firewall; and when the first filtering parameter is not met for an evaluated communication between the first and second devices, the evaluation of the first rule results in the evaluated communication being blocked by the firewall without further evaluation by the second rule.

* * * * *